United States Patent [19]

Barder et al.

[11] Patent Number: 4,983,369

[45] Date of Patent: Jan. 8, 1991

[54] PROCESS FOR FORMING HIGHLY UNIFORM SILICA SPHERES

[75] Inventors: Timothy J. Barder, Addison; Philip D. DuBois, Lisle, both of Ill.

[73] Assignee: Allied-Signal Inc., Morris Township, Morris County, N.J.

[21] Appl. No.: 440,541

[22] Filed: Nov. 22, 1989

[51] Int. Cl.$^5$ .......................... C01B 33/12; B01J 35/08
[52] U.S. Cl. ..................................... 423/338; 423/335; 423/339; 502/8; 502/10
[58] Field of Search .................. 423/335, 338, 339; 502/8, 10

[56] References Cited

U.S. PATENT DOCUMENTS 3,634,558  1/1972  Stober .................................. 264/0.5
4,567,030  1/1986  Yuasa et al. ........................ 423/326
4,775,520  10/1988  Unger et al. ........................ 423/335

OTHER PUBLICATIONS

Controlled Growth of Monodisperse Silica Spheres in the Micron Size Range, Stober et al., Journal of Colloid and Interface Science 26, 62–69, (1968).

Primary Examiner—John Doll
Assistant Examiner—Lori F. Cuomo
Attorney, Agent, or Firm—Harold N. Wells; Gerhard H. Fuchs; Gerard P. Rooney

[57] ABSTRACT

A process for producing highly uniform microspheres of silica having an average diameter of 0.1–10 μm from the hydrolysis of a silica precursor, such as tetraalkoxysilanes, which is characterized by employing precursor solutions and feed rates which initially yield a two-phase reaction mixture.

22 Claims, 1 Drawing Sheet

FIGURE I Comparative Example, Single-Phase Reaction.
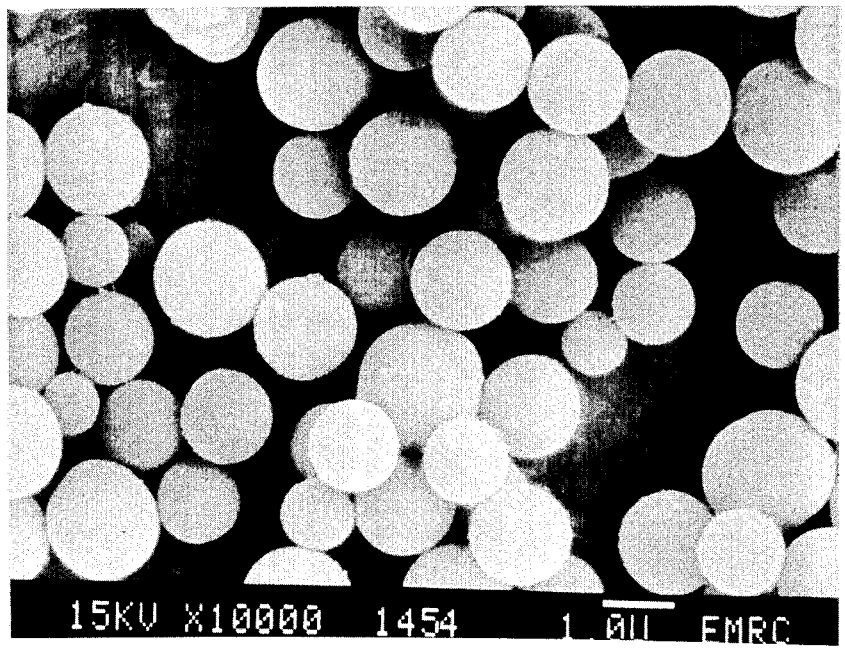
FIGURE II Comparative Example, Two-Phase Reaction
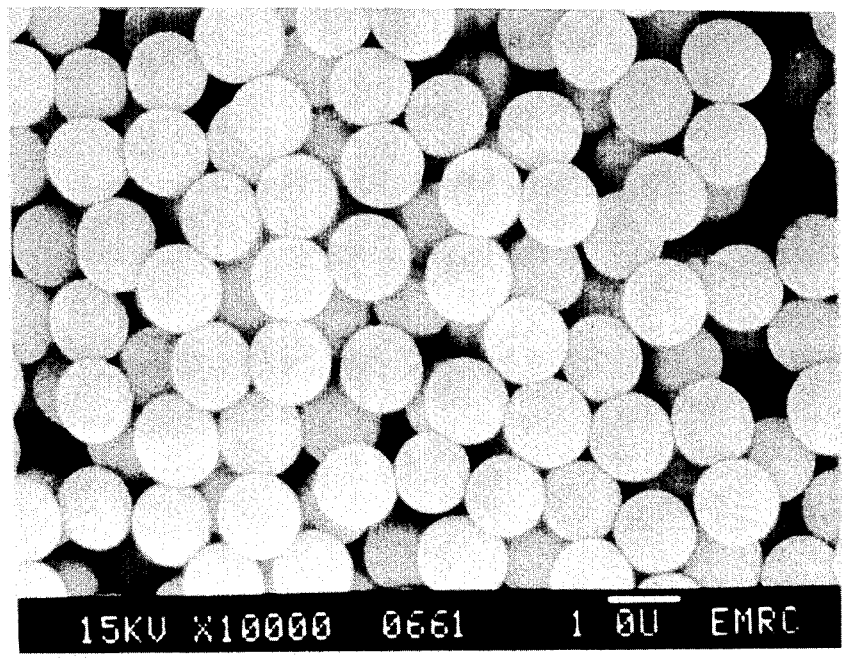

PROCESS FOR FORMING HIGHLY UNIFORM SILICA SPHERES

This invention relates to an improved process for preparing small spheres of silica having many applications, such as for catalyst supports and in high pressure liquid chromatography. Such spheres should be rather small, typically about 0.1 to 10 $\mu$m, but very uniformly sized.

Stober, in U.S. Pat. No. 3,634,558 disclosed a method for making monodisperse silica spheres. An alcoholic aqueous ammonia solution was prepared and tetraalkyl silicates (i.e., tetraalkoxy-silanes) were added with agitation. Particles were observed 1-5 minutes after the tetraalkyl silicates were added. The final particle size was said to have been reached in about 15 minutes. The effect of varying alcohols and alkylsilicates was reported. Generally, the patentee found that particles above 1 $\mu$m were difficult to produce (none with ethanol and ethyl esters) and particles above about 2 $\mu$m apparently were not achieved. Of major importance was the effect of attaching radioactive tracers to the spheres.

Particles in the range of 0.1 to 1.0 $\mu$m were prepared by Yuasa et al., as discussed in U.S. Pat. 4,567,030. The patentees incorporated metals from Groups I, II, III, and IV of the Periodic Table with the hydrolyzable silicon compounds such as tetraalkyl silicates to form particles containing both silica and the selected metals as their oxides. They state that if the content of the metal oxide is 0.01 to 15 mol percent a true sphere with a uniform particle size is obtained. The standard deviation of the particle size is said to be below 1.30. However, the patentees also observe that the amount of water affects the ability to produce spherical shape Also, they state that it is ". . . indispensable that a mixed solution of both the starting compounds should be prepared in advance." In their comparative example, the patentees demonstrate that spheres are not formed if silica and titanium precursors are added separately. Thus, it is clear that Yuasa et al. teach that both silica and another metal oxide should be present in order to prepare uniform spherical particles, although only in the relatively small size range of 0.1-1.0 $\mu$m. In discussing the conditions affecting the particle size, the patentees observe that increasing the concentration of base (ammonia is preferred) increases the size of the particles and that increasing the water concentration also increases the particle size and further, that organic solvents having a greater number of carbon atoms produce larger particle sizes.

In one method, Yuasa et al. add the mixed silica and metal oxide precursor solutions to the alkaline solvent and they state that the method of addition is not particularly critical, although they prefer adding the solution over a period of time. In another method, they add seeds of silica to the alkaline solvent as a core for the larger particles to be formed They also suggest a third method in which a hydrolyzable organic silicon compound is added after the mixed silica/metal oxide precursor solution has been mixed with the alkaline solvent. Again, it is preferred that the secondary addition of a silica precursor be done over a period of time rather than all at once. The product is said by Yuasa et al. to have a surface area of at least 100 m$^2$/gm, but this could be reduced by calcining the product.

A non-porous spherical particle of only silica was made by a different method discussed in U.S. Pat. 4,775,520 to Unger et al. Their particles were said to have mean particle diameters of 0.05 to 10 $\mu$m, although no particles larger than 3.1$\mu$m were actually exemplified. A two-stage process was employed which was similar to one method of Yuasa et al. in that continuous addition of a tetraalkoxysilane was used to increase the size of the particles. The patentees defined their process as adding the silica precursor solution to a preformed sol of seed particles at a rate at which substantially no additional particles were formed, that is, the number of particles initially added determined the number of spheres produced It was characteristic of the particles formed by Unger et al. that they were non-porous and highly uniform. They assumed that pores in the original seed particles are sealed by the secondary growth and that new pores do not form. While the process of Unger et al. is an advance in the art, they do not provide a method for producing microspheres having high porosity and of a predetermined mean diameter. The applicants have studied this problem and discovered a method by which the physical properties of the spheres produced can be controlled, as will be seen in the following description.

It should be noted that in each of the Stober, Yuasa et al., and Unger et al. patents the patentees employ solutions which contain a large percentage of an alkanol, typically ethanol, which is in marked contrast with the procedure to be disclosed below.

SUMMARY OF THE INVENTION

An improved process for producing uniform microspheres of silica having an average diameter between 0.1 and 10 $\mu$m is characterized by the use of a two-phase liquid mixture of the precursor solutions. In one aspect the process is initiated in the absence of small seed particles and the number of microspheres is determined while two phases are present. In another aspect the process is initiated in the presence of seed particles or previously formed microspheres. Broadly, the process combines a hydrolyzable silica precursor, an alcohol, ammonia, and water in proportions such that two phases would form. Preferably, feed solutions comprising (1) a hydrolyzable silica precursor, preferably a tetraalkoxysilane such as tetraethoxysilane, optionally including a alcohol, and (2) an aqueous ammonia solution, optionally including an alcohol, are fed into a vessel at rates and with compositions predetermined to provide a two- phase mixture. At least one of solutions (1) and (2) must contain an alcohol, which typically will be an alkanol corresponding to that resulting from the hydrolysis of the silica precursor, although dissimilar alcohols are not excluded The solutions may be added uniformly or non-uniformly, that is, as a single batch, continuously, or discontinuously in a series of batches.

As the hydrolysis reaction proceeds the two-phase liquid mixture becomes single phase as an alkanol is produced by hydrolysis of the silica precursor and the formation of new particles is completed. The time during which a two-phase mixture is present may be adjusted by changing the composition and/or feed rates of the reacting solutions. Generally, the composition of the combined feed solutions will be in the range of 25 to 35 wt. % silica precursor, 5 to 10 wt. % alcohol, 50 to 60 wt. % water, and 5 to 10 wt. % ammonia. The microspheres after being formed may be grown in a single phase liquid medium to the desired diameter without the formation of new solid particles by the addition of precursor solutions which also would form a two-phase mixture in the absence of the single-phase medium.

In a preferred embodiment solution (1) is solely tetraethoxysilane, solution (2) is an aqueous ammonia solution containing ethanol, and the composition of the combined solutions is 25 to 35 wt. % tetraethoxysilane, 5 to 10 wt. % ethanol, 50 to 60 wt. % water, and 5 to 10 wt. % ammonia. The reaction is carried out at about 10 to 50° C. Once the two-phase mixture has disappeared, the particles may be grown to a uniform size above 1.0 μm having a high porosity by continuous addition of solutions (1) and (2).

In another aspect, the process includes growing seed particles or previously formed microspheres to larger sizes using the two-phase precursor solutions as described above. A dispersion of small particles in water, optionally containing ammonia and/or an alkanol may be prepared and then the precursor solutions are added.

In one aspect of the invention the process can be adapted to provide either high porosity i.e. 100 to 300 $m^2/gm$ or low porosity near the theoretical for fully dense spheres. Initially high surface areas may be reduced by contact with water. Alternatively, high surface areas may be retained by avoiding contact of the microspheres with water.

DESCRIPTION OF THE FIGURES

FIG. 1 is a photomicrograph of spheres produced in the single-phase reaction of comparative Example I.

FIG. 2 is a photomicrograph of spheres produced in the two-phase reaction of Example II.

DESCRIPTION OF THE PREFERRED EMBODIMENTS

Precursor Solutions

Broadly, the process combines a hydrolyzable silica precursor, an alcohol, ammonia, and water in proportions such that two phases would form Typically, two precursor solutions will be prepared, although more than two could be employed if desired. The first solution, contains a hydrolyzable silica precursor, such as a tetraalkoxysilane, represented by formula $Si(OR)_4$ where R is a lower alkyl group. Examples are tetramethoxysilane, tetraethoxysilane, tetrapropoxysilane, tetrabutoxysilane, tetraisopropoxysilane, tetraisobutoxysilane and tetrasecbutoxysilane. Tetraethoxysilane, with or without a solvent such as an alcohol, is a preferred source of the silica microspheres. When an alcohol solvent is used, typically it will be the same as is produced by hydrolysis of the silica precursor but this is not required The hydrolyzable silica precursor, preferably tetraethoxysilane, reacts with water to decompose into silica, probably via intermediate compounds which subsequently react further to provide silica. When tetraethoxysilane is the silica precursor, the reaction with water produces ethanol and silica or the intermediate compounds formed as the ethoxy moieties react with water.

Alkoxysilanes which include alkyl groups such as the alkyltrialkoxysilanes may be included in the precursor solutions to provide silica spheres containing alkyl moieties. Examples of such alkylalkoxysilanes are methyl triethoxysilane, ethyltriethoxysilane, and the like.

The second precursor solution is an aqueous ammonia solution, optionally containing an alcohol. Generally, although it is not necessary, an alcohol consistent with the alcohol produced by hydrolysis of the tetraalkoxysilane typically is employed. Thus, ethanol would be used when the silica precursor is tetraethoxysilane. Alternatively, other alcohols could be used, provided that spherical silica particles are formed. However, at least one of the precursor solutions will contain an alcohol, preferably an alkanol corresponding to that produced by the hydrolysis of the silica precursor.

The composition of the precursor solutions will be determined by the desired composition of the reacting mixture. Thus, the actual composition of each precursor solution may be adjusted and the rate at which the solution is added also may be varied to provide the desired composition in the reacting mixture. It will be evident that considerable flexibility is available in the process since the composition of the precursor solutions can be varied as well as their relative rates of addition. Although in many applications a predetermined set of compositions and rates will be maintained, it is within the scope of the invention to vary both variables to adjust the reacting composition during the process. However, the composition of the combined solutions will be such that the reaction mixture initially forms two phases.

Broadly, such compositions may be 20 to 50 wt. % silica precursor, 5 to 30 wt. % alkanol, 40 to 70 wt. % water, and 5 to 10 wt. % ammonia. Preferred compositions would be within the range of 25 to 35 wt. % silica precursor, 5 to 10 wt. % alkanol, 50 to 60 wt. % water, and 5 to 10 wt. % ammonia.

The length of time the combined solutions remain as two phases is believed to be determined primarily by the amount of alcohol present at any given time, which is the sum of the alcohol initially present, if any, plus the alcohol added as a solvent with the precursor solutions and the alcohol produced by hydrolysis of the silica precursor compound. It has been found that, when the silica precursor is tetraethoxysilane and ethanol is the solvent, that the combined and reacting solutions appear to become single phase when the solution reaches about 45 wt. percent ethanol.

The Process

It was typical of the prior art that primary particles (seeds) were preformed, which were later grown to larger sizes. The inventors have found that seed particles are not required, although they are not excluded They may merely introduce the precursor solutions into an empty vessel in the absence of seed particles. Alternatively, they may begin the process with a solution containing no solid particles or with a slurry of previously formed particles which are to be grown during the process. However, in all cases the composition of the precursor solutions is such that two liquid phases would form when the solutions are mixed. This contrasts with the prior art which employed a large amount of alcohols and inherently would have formed a single phase solution. Greater uniformity and control of the final particles is possible. This result is believed contrary to what might be intuitively expected since one of the two phases consists of droplets of the silica precursor suspended in an aqueous/alcoholic ammonia phase. It should be noted that the terms "two-phase" and "single-phase" as used herein refer to the number of liquid phases to the exclusion of any solid particles which may be present. If no seed or preformed microspheres are present when the precursor solutions are mixed, the hydrolysis reaction appears to determine the number of initial particles, which are to be grown to the desired diameter. Thus the conditions in the two-phase reacting solution are believed to determine the number and size of the particles and thus, indirectly, the ultimate size as well.

For purposes of the following discussion, the preferred silica precursor tetraethoxysilane will be considered as it reacts with water in the presence of ammonia and ethanol and produces additional ethanol and silica or the intermediate ethoxysilanols. As a molecule of tetraethoxysilane reacts with a molecule of water, a molecule of ethanol is formed leaving the intermediate compound triethoxysilanol, $(EtO)_3Si(OH)$, which can be further reacted with another molecule of water or with another molecule of tetraethoxysilane or an intermediate thereof. While the finished particles are substantially only silica, the composition of the reacting surface of any individual particle at any time during the process is unknown, but it seems likely that the particle will contain both silica and the intermediate products at the same time. It seems probable also that the presence of the by-product ethanol will influence the access of water molecules to the reacting silicon compounds, but the actual effect is not known. However, it is observed that when two phases are present in the reacting solution, which is vigorously agitated, reacting tetraethoxysilane forms a dispersed phase in an ethanol-water-ammonia continuous phase Thus the number of spheres ultimately formed is believed to be affected by the number of droplets of reacting tetraethoxysilane in the mixture, although the number of spheres is much larger than the droplets of tetraethoxysilane. It is believed that the particles of tetraethoxysilane serve to saturate the surrounding solution at all times. Once enough ethanol has been produced, the tetraethoxysilane is completely dissolved and the amount of tetraethoxysilane available for reaction is determined by the addition rate. On the other hand, if one begins with a single phase mixture instead of a the two-phase mixture of the present invention, the result appears to be less control over the number and size of the particles formed, as will be seen in the examples below. However, in the instance where preformed spheres are present, addition of the precursor solutions of the invention may not create a two-phase mixture but growth of uniform spheres has been found to be possible.

The process will be carried out at near room temperature, but is considered to be feasible at temperatures in the range of 10 to 50° C. The temperature would be expected to affect reaction rates and solubility of the reactants and an optimum temperature should be selected There is no need to operate under elevated or sub-atmospheric pressures, but they are not necessarily excluded if desirable for other reasons. The degree of mixing of the reactants would also be expected to affect the results. Generally, low shear mixing will be employed.

The two-phase solution after a period of time becomes single phase, because sufficient ethanol has been formed to dissolve the remaining tetraethoxysilane and its reacting intermediates. Thereafter, the particles can be grown by continuing to add the two-phase precursor solutions until the microspheres reach the desired size, which may be 0.3 to 5 $\mu$m or more. However, unlike the process of Unger et al. the applicants have found that the growth of the spheres may be carried out at a rate many times that used by Unger et al. and without necessarily reducing the porosity of the spheres. In fact highly uniform porous spheres having a BET surface area of up to 250 $m^2/gm$ have been made. Typically, the precursor solutions will continue to be added at the same rates used during the two-phase reaction and the spheres grown at an accelerated rate. The addition rates can be increased or decreased as the spheres grow, although this is not necessary. Also, it is not essential to add the precursor solutions continuously; an approximation by periodic additions of the precursor solutions has been found to produce similar results. In fact, as will be seen in the examples, it is possible to carry out the reaction in a completely batch manner. It should be emphasized that while formation and growth of microspheres may be carried out in many ways, that is, beginning with an empty reactor or with preformed seeds or spheres and adding the precursor solutions continuously or in batches or semi-continuously, the common essential factor is that the precursor solutions when combined form a two-phase mixture.

Highly porous spheres may be converted to low porosity spheres by recovering and redispersing the porous spheres in water for up to about 24 hours after addition of the precursor solutions has ceased. It also has been found that lengthy contact with the solution after the addition of the silica precursor has ceased will tend to produce low surface area spheres. There is no need to add the silica precursor at a low rate to close the pores as taught by Unger et al. On the other hand, rapid addition of the precursors yields very porous particles without the formation of additional seed particles. Increasing the rate at which the precursor solutions are added does not produce uniform spheres when a single phase process like that of Unger et al. is employed, but rapid addition of the precursor solution does provide uniform spheres in the process of the invention. The porosity may be maintained by harvesting the spheres at once and avoiding further contact with water, for example by storing them in ethanol.

In the following examples, the feed solutions are premixed and placed in reservoirs where they are added with stirring to a reactor vessel either continuously at predetermined rates or stepwise using premeasured volumes over predetermined time intervals. Typically, the reservoir containing the tetraalkoxysilane is kept under a nitrogen purge to exclude moisture. In some instances the vessel is initially empty and in others the vessel contains an initial amount of a liquid dispersion of seeds, i.e., small particles or previously made spheres which are to be grown to a larger size. While continuous addition of the precursor solutions is generally preferred since such a technique provides control of the process, it is not necessary as the examples will show. It will be seen that the process of the invention can be carried out as a batch process or in a quasi-continuous manner as long as the composition of the precursor solutions provides two phases when combined in the absence of any reacting solution.

EXAMPLE I (Comparative)

Two solutions were prepared and added continuously at rates of 6.0 cc/min (Solution 1) and 10.9 cc/min (Solution 2) to the reactor. Solution 1 contained 48.3 wt. % tetraethoxysilane (TEOS) in ethanol. Solution 2 contained 44 wt. % ethanol, 7.2 wt. % $NH_3$, and 48.8 wt. %. deionized water. When combined at the rates given, the mixture would contain 16.8 wt. % TEOS, 46.7 wt.

% ethanol, 31.9 wt. % water, and 4.7 wt. % NH3. Such a mixture is mutually soluble and is observed to be a one-phase mixture.

After 45 minutes addition of the two precursor solutions, microspheres were found by examining a sample of the particles with scanning electron microscope photography to be non-uniform, with diameters of 0.5 –1.5 $\mu$m.

EXAMPLE II

Solution 1 contained 81 wt. % TEOS in ethanol. Solution 2 contained 12.8 wt. % NH3 in deionized water. The solutions were added to an empty two liter reactor at rates of 1.9 cc/min and 2.7 cc/min, respectively, for 3 hours. The combined solution initially had a composition of 32.4 wt. % TEOS, 7.4 wt. % ethanol, 52.6 wt. % water, and 7.7 wt. % NH3. Such a mixture is observed to contain two phases which is attributed to the much lower ethanol content as compared to Example I in which only one phase was present.

The microspheres were centrifuged and then redispersed in deionized water, settled, re-centrifuged and dried. They were found to be highly uniform (1.1 ±0.1 $\mu$m). The BET surface area was measured to be 246 m2/g, compared to a theoretical surface area of about 2.6 m2/gm for a completely dense sphere of 2.2 g/cc density.

EXAMPLE III

Solution 1 contained 100% TEOS and Solution 2 contained 11.3 wt. % ethanol, 10.6 wt. % NH3 and 78 wt. % deionized water. They were added continuously to an empty 4 liter conical reactor at 2.4 cc/min and 5.1 cc/min, respectively, for 95 minutes. The combined solutions were initially 32.4 wt. % TEOS, 7.4 wt. % ethanol, 7.7 wt. % NH3, and 52.6 wt. % water. The microspheres were allowed to remain in the solution for 7 days, after which they were centrifuged, redispersed in a 6M NH4OH solution, centrifuged again, washed with water and ethanol, and then dried. The spheres were uniform (1.2 $\mu$m ±0.1 $\mu$m) but the BET surface area was measured to be 3.9 m2/gm, compared to a theoretical surface area of 2.3 m2/gm for fully dense spheres of 2.2 gm/cc density.

It is believed that since the mixed solutions gave substantially the same composition in both Examples II and III that the reduced surface area in Example III was caused by the handling of the microspheres after they were formed.

EXAMPLE IV

The reaction of Example III was repeated except that addition of the precursor solutions was carried out for 140 minutes. Thereafter, instead of remaining in contact with the solution for 7 days, after only one day the microspheres were separated, redispersed twice in deionized water and allowed to settle overnight, after which the water phase was decanted. The microspheres were then redispersed in ethanol, which was evaporated to recover the spheres Highly uniform spheres (1.3 $\mu$m ±0.1 $\mu$m) were found, with the BET surface area measured as 77 m2/gm (versus a theoretical minimum surface area of about 2.1 m2/gm for fully dense spheres).

EXAMPLE V

The reaction of Example III was repeated except that the precursor solutions were added over 170 minutes instead of 95 minutes. The spheres produced were larger and still very uniform (1.5 $\mu$m ±0.1 $\mu$m). The BET surface area was found to be 1.4 m2/gm versus a theoretical value of 1.8 m2/gm for fully dense spheres.

EXAMPLE VI

The reaction of Example III was repeated six times to produce a combined batch of microspheres having a size of 1.5 $\mu$m ±0.1 $\mu$m. The addition rate for TEOS for these runs was 2.4, 2.4, 2.3, 2.5, 2.4, and 1.8 cc/min and the reaction time was increased to 5.5, 4.0, 3.8, 5.0, 2.8, and 2.5 hrs. The microspheres were harvested after being in contact with the solution for one day following the procedures of Example IV. The initial BET surface area was found to be 210 m2/gm. A 25 gm sample was redispersed in water and stirred for 16 hours, then centrifuged and vacuum dried at 110° C for 16 hours. The BET surface as then found to be only 1.2 m2/gm compared to a theoretical value of 1.8 m2/gm for a fully dense sphere (The reason for discrepancy between these values has not been determined) The water soaked sample was then redispersed in ethanol for 16 hours and harvested as before. The BET surface area was found to be less than 1 m2/gm. The original sample also was redispersed in a 6M NH4OH solution and stirred for 16 hours and harvested as before. The BET surface area was found to be 6.3 m2/gm.

It was concluded that contact with water resulted in an irreversible loss in surface area.

EXAMPLE VII

The reaction of Example III was repeated to provide 1.1 $\mu$m ±0.1 $\mu$m spheres. The reaction time was 3 hours rather than 2 hrs and 20 minutes. Rather than holding the microspheres in the mother liquid, the resulting reaction solution was stirred and 70 cc portions removed and added to 1000 cc portions of ethanol or deionized water. These mixtures were stirred for a predetermined period of time, then allowed to settle, the liquid decanted and the microspheres dried at 80° C for 16 hours. The difference between contact with water and ethanol was marked, as will be seen in the following table.

| Time in Solution, days | BET Surface Area, m²/mg | |
|---|---|---|
| | Water | Ethanol |
| 1 | 51 | 222 |
| 3 | 24 | 239 |
| 8 | 7 | 224 |
| 9 | 9 | 224 |
| 22 | 6 | 187 |

These results support the conclusions advanced before, that exposure of the fresh microspheres to water results in a substantial loss in surface area.

EXAMPLE VIII

A two-phase reaction mixture was produced by adding 1000 cc of 100% TEOS to 2100 cc of a solution containing 11.3 wt. % ethanol, 10.6 wt. % NH3, and 78 wt. % deionized water. The mixture was stirred for 16 hours and was observed to become single phase after about one hour. The resulting solution of microspheres was allowed to stand for 6 days and then was centrifuged and dried at 80° C. The microspheres were found to have a diameter of 0.3 $\mu$m ±0.1 $\mu$m and a BET surface area of 13 m²/gm, compared to a theoretical value of 9.1 m²/gm for a fully dense sphere.

All of the preceding samples have illustrated embodiments of the invention in which the reaction was carried out beginning with an empty vessel, that is, no seeds or initial solution was used. The following examples illustrate applications of the process which grow preformed particles.

EXAMPLE IX

A two-phase reaction mixture was produced by adding to 200 cc of an aqueous-methanolic-ammoniacial solution (78 wt. % deionized water, 10.6 wt. % $NH_3$, 11.3 wt. % methanol) 16 cc of 100% tetramethyl orthosilicate (TMOS). The mixture was stirred for 1 hour. The reaction appeared to be completed in about 1 minute with turbidity (visible formation of particles) being observed after only about 5 seconds. The spheres formed were less than 0.5 μm diameter and were agglomerated into larger particles.

EXAMPLE X

The reaction of Example IX was repeated except that ethanol replaced methanol A similar result was obtained.

EXAMPLE XI

The reaction of Example IX was repeated except that 100 cc of TEOS replaced 16 cc of TMOS. The reaction was slower and produced <0.5 μm spheres which were not agglomerated. The reaction appeared complete after 15 minutes and turbidity was observed after 2 minutes

EXAMPLE XII

The reaction of Example XI was repeated except that propanol replaced methanol The reaction appeared complete in about 15 minutes and turbidity was observed in about 2 minutes. The <0.5 μm spheres were agglomerated.

EXAMPLE XIII

Seed particles were prepared by reacting a solution of 3.7 cc TEOS dissolved in 29 cc of ethanol with a solution containing 15 cc ethanol, 9.5 cc distilled water and 8.5 cc of concentrated $NH_4OH$ (29 wt. % $NH_3$) for 40 minutes. This solution was single phase during the formation of the seed particles, which were found to have a diameter of 0.5 μm ±0.1 μm. The seeds were centrifuged and redispersed in 11 cc of a solution containing 39.5 wt. % ethanol, 52.2 wt, % water, and 8.3 wt. % $NH_3$ and placed in a 2 liter conical reactor.

Solution 1 (81 wt. % TEOS in ethanol) and Solution 2 (12.8 wt. % $NH_3$ in deionized water) were continuously added to the seed solution for 3 hours at 1 9 cc/min and 2.7 cc/min, respectively. The solution was initially observed to be two-phase, but later became single phase After the reaction, the microspheres were stirred in the solution for 14 days and then harvested by centrifuging, washing in ethanol and air drying. The spheres were found to be 2.5–2.6 μm diameter but about 10% were less than 1 μm diameter. The BET surface area was measured to be 1.1 m²/gm, which is the theoretical area of a 2.5 μm fully dense sphere.

EXAMPLE XIV

Twenty grams of microsphere (1.1 μm ±0.1 μm) previously prepared were redispersed in 220 cc of a solution containing 39.5 wt. % ethanol, 52.2 wt. % $H_2O$, and 8.3 wt. % $NH_3$ and placed in a 4 liter conical reactor. Solutions 1 and 2 were added as in Example XIII for 2 hours The resulting microspheres were left in the reaction solution for 3 days, then centrifuged, washed in ethanol and air dried. The resulting spheres were 2.0 μm ±0.1 μm diameter and had a BET surface area of 190 m²/gm.

EXAMPLE XV

Solution 1 contained 100% TEOS. Solution 2 contained 11.3 wt. % ethanol, 10.6 wt. % $NH_3$, and 78 wt. % deionized water. Six (6) cc of Solution 1 was added to 12.5 cc of Solution 2 and stirred for 5 minutes to form a seeded solution. Then Solution 1 and 2 were added continuously at 2.4 cc/min and 5.1 cc/min respectively for 3.6 hours. The microsphere-containing mixture was stirred overnight and then settled and decanted. The spheres were redispersed in deionized water and stirred for 2 days, then centrifuged and air dried. The product was very uniform (2.5 μm ±0.1 μm) and had a BET surface area of <1 m²/gm.

EXAMPLE XVI

The precursor solutions were the same as in Example XV. Twenty four (24) cc of Solution 1 and 50 cc of Solution 2 were mixed and stirred for 5 minutes to form a seeded solution. Then Solutions 1 and 2 were added as in Example XV for 5.6 hours. Then the mixture was stirred overnight and centrifuged to harvest the microspheres, which were dried at 110° C. for 16 hrs. The product was very uniform (1.5 μm ±0.1 μm) and had a BET surface area of <1 m²/gm.

EXAMPLE XVII

The precursor solutions of Example XV were added to a 4 liter conical reactor in a batch mode to form a seeded solution. Twenty-four (24) cc of Solution 1 and 50 cc of Solution 2 were added to the reactor and stirred for 5 minutes until the initial particles formed. Then additional units 24 cc of Solution 1 and 50 cc of Solution 2 were introduced every 5 minutes until 12 units had been added. After stirring overnight the microspheres were centrifuged and then dried at 110° C. for 16 hours. The spheres were found to be very uniform, 1.2 μm ±0.1 μm.

EXAMPLE XVIII

The procedure of Example XVII was repeated but after the first 12 additions, additional units of the precursor solutions were added at 3.5 minute intervals for another 2 hours and 15 minutes. After harvesting the microspheres as in Example XVII, the product was found to be 2.3 μm ±0.1 μm.

EXAMPLE XIX

As in Example XVII 24 cc of Solution 1 and 50 cc of Solution 2 were mixed and stirred for 5 minutes to form seed particles. Then units of 36 cc of Solution 1 and 76 cc of Solution 2 were added at 5 minute intervals for a total of 12 units. The microspheres were stirred overnight in the reaction solution and then harvested as in XVII. The product was found to be 1.5 μm ±0.1 μm

EXAMPLE XX

One thousand (1,000) cc sample of the reaction solution from Example XVII containing 1.7 μm spheres was placed in another vessel before the spheres were harvested in Example XVII. Then the precursor solutions were added at 3.5 minute intervals for 1 hour and 50 minutes The microspheres were found to be very uniform, having 2.8 μm ±0.1 μm diameter.

We claim:

1. A process for producing microspheres of silica having a uniform size between 0.1 and 10 μm diameter comprising:
   (a) combining a hydrolyzable silica precursor, an alcohol, ammonia, and water in proportions such that two liquid phases would form and wherein the combined composition is 20–50 wt.% hydrolyzable silica precursor, 5–30 wt.% alkanol, 40–70 wt.% water and 5–10 wt.% ammonia,
   (b) forming microspheres by hydrolysis of said silica precursor in the mixture of (a),
   (c) recovering the microspheres formed in (b).

2. The process of claim 1 wherein said hydrolyzable silica precursor, optionally combined with an alcohol forms a first precursor solution and said ammonia and water, optionally containing an alcohol forms a second precursor solution.

3. The process of claim 1 wherein the hydrolyzable silica precursor is at least one member of the group consisting of tetralkoxysilanes and alkylalkoxysilanes.

4. The process of claim 3 wherein the hydrolyzable silica precursor is tetraalkoxysilane.

5. The process of claim 4 wherein the tetralkoxysilane is tetraethoxysilane.

6. The process of claim 1 wherein said alcohol is at least one member of the group consisting of methanol, ethanol, propanols, butanols, and pentanols.

7. The process of claim 6 wherein said alcohol is ethanol.

8. The process of claim 1 wherein said hydrolyzable silica precursor is tetralkoxysilane and said alkanol is the same as that produced by hydrolysis of said tetraalkoxysilane.

9. The process of claim 8 wherein said tetraalkoxysilane is tetraethoxysilane and said alkanol is ethanol.

10. The process of claim 1 wherein the process is carried out at a temperature of about 10°C. to 50°C.

11. The process for producing microspheres of silica having a uniform size between 0.1 and 10 μm diameter comprising:
    (a) preparing a dispersion of silica spheres in water, optionally containing ammonia and/or an alkanol,
    (b) adding to said dispersion of (a) a hydrolyzable silica precursor, an alcohol, ammonia, and water in proportions such that two liquid phases form and wherein the combined composition is 20–50 wt.% hydrolyzable silica precursor, 5–30 wt.% alkanol, 40–70 wt.% water and 5–10 wt.% ammonia,
    (c) growing the silica spheres of (a) by hydrolysis of said silica precursor,
    (d) recovering the microspheres grown in (c).

12. The process of claim 11 wherein said hydrolyzable silica precursor, optionally combined with an alcohol forms a first precursor solution and said ammonia and water, optionally containing an alcohol forms a second precursor solution.

13. The process of claim 11 wherein the hydrolyzable silica precursor is at least one member of the group consisting of tetralkoxysilanes and alkylalkoxysilanes.

14. The process of claim 13 wherein the hydrolyzable silica precursor is tetraalkoxysilane.

15. The process of claim 14 wherein the tetralkoxysilane is tetraethoxysilane.

16. The process of claim 11 wherein said alcohol is at least one member of the group consisting of methanol, ethanol, propanols, butanols, and pentanols.

17. The process of claim 16 wherein said alcohol is ethanol.

18. The process of claim 11 wherein said hydrolyzable silica precursor is tetraalkoxysilane and said alkanol is the same as that produced by hydrolysis of said tetraalkoxysilane.

19. The process of claim 19 wherein said tetraalkoxysilane is tetraethoxysilane and said alkanol is ethanol.

20. The process of claim 11 wherein the process is carried out at a temperature of about 10° C. to 50° C.

21. The process of claim 1 wherein the combined composition of (a) is
    25–35 wt. % hydrolyzable silica precursor
    5–10 wt.% alkanol
    50–60 wt. % water and
    5–10 wt.% ammonia.

22. The process of claim 11 wherein the combined composition of (b) is
    25–35 wt.% hydrolyzable silica precursor
    5–10 wt.% alkanol
    50–60 wt.% water and
    5–10 wt.% ammonia.

* * * * *

UNITED STATES PATENT AND TRADEMARK OFFICE
CERTIFICATE OF CORRECTION

PATENT NO. : 4,983,369

DATED : January 8, 1991

INVENTOR(S) : Timothy J. Barder and Philip D. DuBois

It is certified that error appears in the above-identified patent and that said Letters Patent is hereby corrected as shown below:

```
Column 2, line 14: after "produced" insert --.--
Column 3, line 39: after "form" insert --.--
          line 52: after "required" insert --.--
Column 4, line 47: after "excluded" insert --.--
Column 5, line 28: after "phase" insert --.--
          line 52: after "selected" insert --.--
Column 7, line 1:  "NH3" should read --NH_3--
          lines 25 and 26: "m2" should read --m^2--
          line 31: "NH_3and" should read --NH_3 and--
          line 60: after "spheres" insert --.--
Column 8, line 21: after "sphere" insert --.--
          line 22: after "determined)" insert --.--
          line 27: "m2" should read --m^2--
          line 62: "NH3" should read --NH_3--
```

UNITED STATES PATENT AND TRADEMARK OFFICE
CERTIFICATE OF CORRECTION

PATENT NO. : 4,983,369

DATED : January 8, 1991

INVENTOR(S) : Timothy J. Barder and Philip D. DuBois

It is certified that error appears in the above-identified patent and that said Letters Patent is hereby corrected as shown below:

```
Column  9, line 33: after "minutes" insert --.--
           line 55: "1 9" should read --1.9--
           line 58: after "phase" insert --.--
Column 10, line  2: "NH₃and" should read --NH₃ and--
           line  4: after "hours" insert --.--
```

Signed and Sealed this

Fourteenth Day of July, 1992

Attest:

DOUGLAS B. COMER

*Attesting Officer*   *Acting Commissioner of Patents and Trademarks*